(12) United States Patent
Aoki et al.

(10) Patent No.: US 6,206,637 B1
(45) Date of Patent: Mar. 27, 2001

(54) GAS TURBINE BLADE

(75) Inventors: Sunao Aoki; Eisaku Ito, both of Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/284,072

(22) PCT Filed: Jul. 7, 1998

(86) PCT No.: PCT/JP98/03055

§ 371 Date: Apr. 7, 1999

§ 102(e) Date: Apr. 7, 1999

(87) PCT Pub. No.: WO00/01928

PCT Pub. Date: Jan. 13, 2000

(51) Int. Cl.⁷ .................................. F01D 9/04; F01D 9/06
(52) U.S. Cl. ................................. 416/96 R; 416/223 A; 416/243; 415/114; 415/115
(58) Field of Search ................. 416/96 A, 96 R, 416/97 R, 223 A, 243, DIG. 2; 415/114, 115

(56) References Cited

U.S. PATENT DOCUMENTS 3,836,283 * 9/1974 Matsuki et al. ................... 416/96
5,536,143 7/1996 Jacala et al. .
6,004,095 * 12/1999 Waitz et al. ...................... 415/119

* cited by examiner

*Primary Examiner*—Christopher Verdier
(74) *Attorney, Agent, or Firm*—Sughrue, Mion, Zinn, Macpeak & Seas, PLLC

(57) ABSTRACT

A blade for a gas turbine includes an internally formed passage (a) for cooling the blade with steam. The ratio (t/c) of blade thickness (t) to chord length (c) should fall within the range of 0.10 to 0.15.

1 Claim, 5 Drawing Sheets

GAS TURBINE BLADE

BACKGROUND OF THE INVENTION

1. Technical Field of the Invention

The present invention relates to a blade for a gas turbine, and more particularly to a gas turbine blade adapted to be internally cooled by a coolant steam flowing through the interior of the gas turbine blade.

2. Description of the Related Art

A conventional gas turbine for a combined cycle is shown in FIG. 5 to FIG. 7. As is shown in FIG. 5, the gas turbine 1 includes a plurality of alternately disposed stationary blades 2 and moving blades 4. A main gas flow of high temperature is fed to the gas turbine 1 from a combustor (not shown) to effect the moving blades 4 via the stationary blades 2 and rotate a rotor of the turbine at a high speed to thereby generate power.

Each of the stationary blades 2 of the turbine is provided with coolant steam pipes 3. Further, a plurality of radial coolant steam flow path sections a are formed inside the stationary blade 2, as can be seen in FIG. 7, wherein these coolant steam flow path sections are serially interconnected at a base end portion and a tip end portion of the stationary blade to thereby form a serpentine passage that extends from a leading edge side to a trailing edge side of the turbine stationary blade.

When the gas turbine is put into operation with the high temperature main gas being fed to the gas turbine, the stationary blade 2 is heated. In this case, however, the coolant steam is supplied to the coolant steam flow path section a formed inside of the stationary blade 2 of the turbine and located adjacent to the leading edge thereof to sequentially flow through the coolant steam flow path sections which form the serpentine passage. Hence, the stationary blade 2 of the turbine can be cooled from the internal surfaces thereof. Moreover, the coolant steam used for cooling the stationary blade 2 of the turbine is subsequently recovered through the coolant steam pipe 3 to be supplied to a succeeding system.

As can be seen from the above, in the combined cycle plant where the gas turbine is used in combination with a steam turbine, steam cooling has been proposed for cooling the gas turbine to enhance the thermal efficiency.

Next, a conventional air impingement cooling scheme is illustrated in FIG. 8 to FIG. 10. Inserts 5a, 5b and 5c are respectively disposed within radially partitioned compartments of a stationary blade 2 for a turbine, each insert having a predetermined gap relative to the inner wall surface of the compartment and a number of small holes 6 are formed therein. Additionally, a number of small holes 7 are also formed in the surface of the stationary blade 2 of the turbine in a predetermined pattern.

In the turbine stationary blade 2 of the structure mentioned above, the cooling air flowing into the inserts 5a, 5b and 5c is ejected through the individual small holes 6 formed in the inserts 5a, 5b and 5c to impinge on the inner wall surfaces of the stationary blade 2 of the turbine to thereby cool the stationary blade 2 from the inside (refer to FIG. 10). Subsequently, the cooling air is ejected from the small holes 7 formed in the surface of the stationary blade to film cool the latter.

When impingement cooling using the cooling air, the ratio t/c of blade thickness t to chord length c of the stationary blade 2 of the turbine, as shown in FIG. 7, is ordinarily selected so as to be at least 0.2 in order to facilitate insertion of the inserts 5a–5c into the interior of the stationary blade 2 of the turbine and ensure an uniform pressure distribution within the interiors of the individual inserts.

Nevertheless, a turbine stationary blade of a profile having the blade thickness/chord length ratio t/c mentioned above requires a large amount of coolant steam, e.g., a major proportion of the steam for the steam turbine of the combined cycle, because convection cooling must be adopted for steam cooling.

Furthermore, leakage of the coolant steam in the coolant steam piping will seriously affect the combined cycle (bottoming cycle), and possibly make the plant nonfunctional.

Also, the diameters of the pipes used in a complicated coolant steam piping system have to be increased due to the demand for a large amount of coolant steam, and this presents problems with respect to the cost and the space for installation of the coolant steam piping arrangement of individual pipes.

OBJECT OF THE INVENTION

In light of the state of the art described above, it is an object of the present invention to provide a blade for a combined cycle gas turbine that can be effectively cooled with a proper amount of steam, to thereby solve the problems mentioned above.

SUMMARY OF THE INVENTION

The present invention provides the following means for achieving the above object.

That is, a blade for a gas turbine according to the present invention includes an internally formed coolant steam passage for cooling the blade with coolant steam flowing through the coolant steam passage, and is characterized in that the ratio of blade thickness of the gas turbine blade to chord length thereof is not greater than 0.15.

By virtue of the structure of the gas turbine blade mentioned above, the flow velocity of the coolant steam flowing through the coolant steam passage increases as the ratio of the blade thickness to the chord length becomes smaller for a given constant flow rate of the coolant steam. Further, the heat transfer rate at the inner wall surface portion of the blade increases correspondingly.

Accordingly, by selecting the ratio t/c of the blade thickness to the chord length so as to be not greater than 0.15, which corresponds to a minimum heat transfer rate required in view of the required cooling performance of the turbine blade, not only can the turbine blade be cooled effectively, but also an appropriate steam flow rate for the combined cycle can also be maintained.

Thus, even when leakage of the coolant steam occurs in the coolant steam piping, the effects of such leakage on the plant's performance can be suppressed to a minimum because the inherent amount of coolant steam is small. Furthermore, due to the small amount of coolant steam required, the steam piping system can be implemented using pipes of small diameters. Thus, the cost and the space required for installation of the complicated piping system for the plant can be reduced.

Furthermore, it is preferred to implement the blade for the gas turbine according to the present invention such that the ratio of the blade thickness of the gas turbine blade to the chord length thereof falls within a range of 0.10 to 0.15.

Owing to the structure mentioned above, effective cooling of the turbine blade with the coolant steam is performed while ensuring effective reutilization of the recovered coolant steam.

DETAILED DESCRIPTION OF THE PREFERRED EMBODIMENTS

Figure 1:
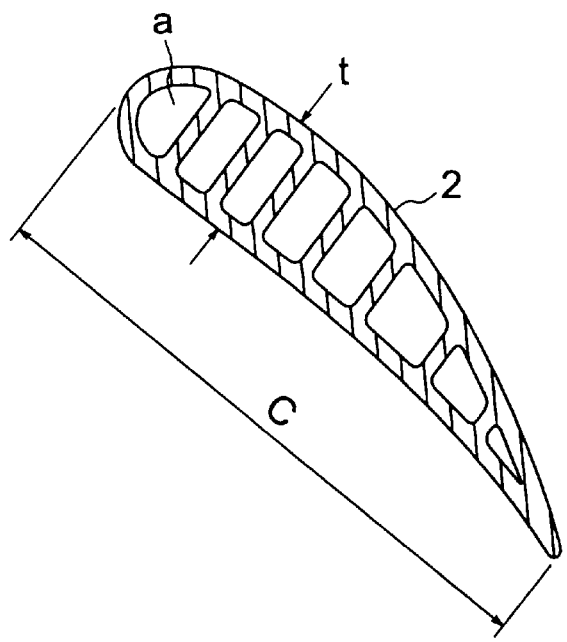
FIG. 1 is a sectional view showing a stationary blade for a turbine according to an exemplary embodiment of the present invention.

The present invention will be described in detail in conjunction with what are presently considered preferred embodiments thereof with reference to FIG. 1 to FIG. 4 of the accompanying drawings. Moreover, the parts or portions mentioned previously in conjunction with the related art are denoted by the same reference numerals, and so repeat description thereof is omitted. Accordingly, the description which follows will mainly be directed to the present invention.

In the following description, like reference numerals designate like or corresponding parts throughout the drawings. Also in the following description, it is to be understood that terms such as "right", "left", "top", "bottom" and the like are words of convenience and are not to be construed as limiting terms.

FIG. 1 is a sectional view showing a stationary blade for a turbine according to an exemplary embodiment of the present invention. Referring to the figure, a stationary blade 2 for a steam cooling type gas turbine has a blade profile such that the ratio t/c of blade thickness t to chord length c is not greater than 0.15. Preferably, the ratio t/c of the blade thickness to the chord length should be selected so as to lie within a range of 0.10 to 0.15.

In the stationary blade 2 of the turbine structured as mentioned above, the coolant steam can enter a coolant steam flow path section a provided inside of the stationary blade 2 of the turbine on the leading edge side thereof and flow in the radial direction from a base end portion of the stationary blade of the turbine toward the tip end thereof. Subsequently, the coolant steam enters a succeeding coolant steam flow path section at the tip end of the blade to reverse flow from the tip end side toward the base end portion. In a similar manner, the coolant steam successively flows from the leading edge side to the trailing edge side through the coolant steam flow path sections formed inside of the stationary blade 2, to thereby cool the turbine stationary blade 2 from the interior.

Figure 2:
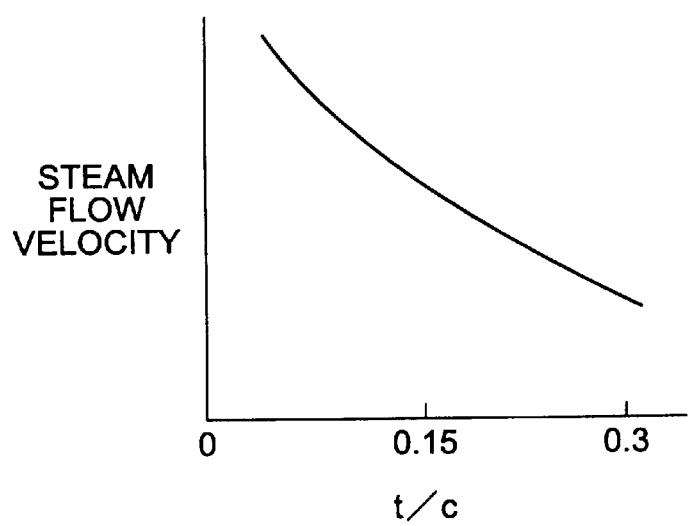
FIG. 2 is a graph illustrating the relationship between the blade thickness/chord length ratio of the stationary blade of the turbine according to the exemplary embodiment shown in FIG. 1 and steam flow velocity.

In this case, it is noted that when the flow rate of the coolant steam is constant, the flow velocity of the coolant steam increases as the ratio t/c of the blade thickness t to the chord length c becomes smaller, as can be seen from the relationship between the blade thickness/chord length ratio t/c of the turbine stationary blade 2 and the steam flow velocity illustrated in FIG. 2.

Figure 3:
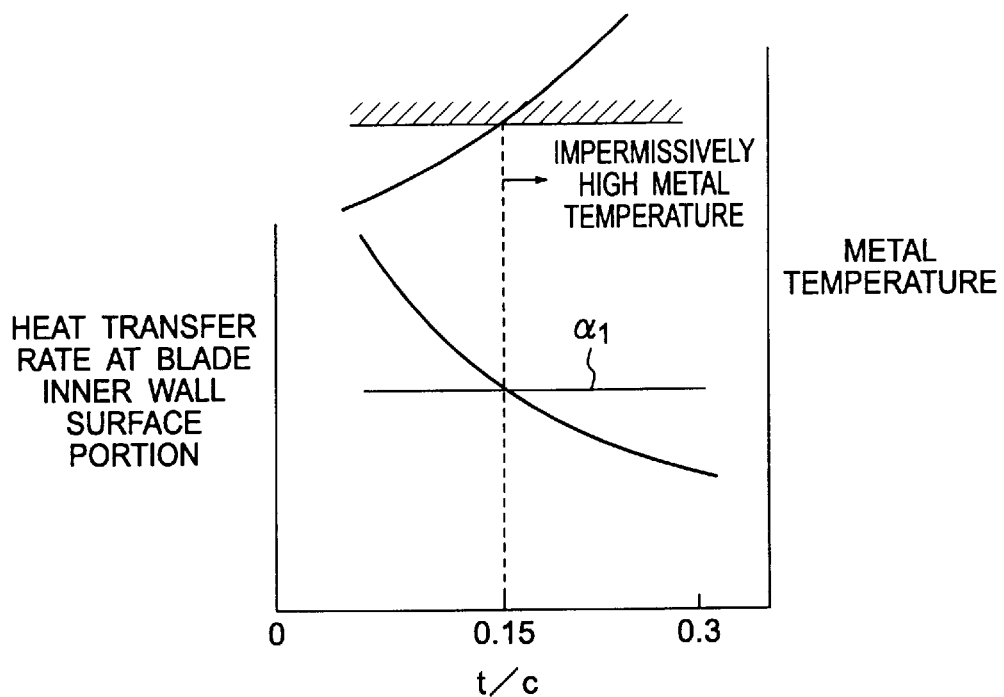
FIG. 3 is a graph illustrating the relationship between the blade thickness/chord length ratio and heat transfer rate at an inner wall surface portion on one hand, and metal temperature on the other hand, of the stationary blade for the gas turbine according to the exemplary embodiment shown in FIG. 1.

Furthermore, as is apparent from the relationship between the blade thickness/chord length t/c and heat transfer rate at an inner wall surface portion of the blade on one hand and the metal temperature on the other hand, shown in FIG. 3, the heat transfer rate at the inner wall surface portion increases as the ratio t/c of the blade thickness t to the chord length c of the turbine stationary blade 2 becomes smaller.

Here, it is noted that a minimum heat transfer rate $\alpha_1$ required in view of the cooling performance of the turbine blade may differ depending on the external gas temperature conditions and pressure condition of the cooled blade. Nevertheless, the minimum heat transfer rate may be defined as the internal heat transfer rate required so that the metal temperature of the blade will not exceed a designed reference value (e.g. not higher than 900° C.). As can be seen in FIG. 3, when the ratio t/c of the blade thickness t to the chord length c exceeds a value of 0.15, the heat transfer rate becomes excessively low, and as a result, the metal temperature of the blade becomes excessively high and exceeds the designed reference value.

Accordingly, by selecting the ratio t/c of the blade thickness t to the chord length c of the stationary blade 2 for the gas turbine to be not greater than 0.15, which corresponds to the minimum heat transfer rate $\alpha_1$ required in view of the cooling performance of the turbine blade, not only can the turbine blade be cooled effectively, but a low steam flow rate appropriate for the combined cycle can be maintained.

Thus, even when leakage of the coolant steam occurs in the coolant steam piping, effects of such leakage on the plant's performance can be suppressed to a minimum because the inherent amount of coolant steam is small. Further, owing to the small amount of the coolant steam required, the steam piping system can be implemented using pipes of small diameter. Thus, the cost and space for the complicated piping system of the plant can be reduced.

Figure 4:
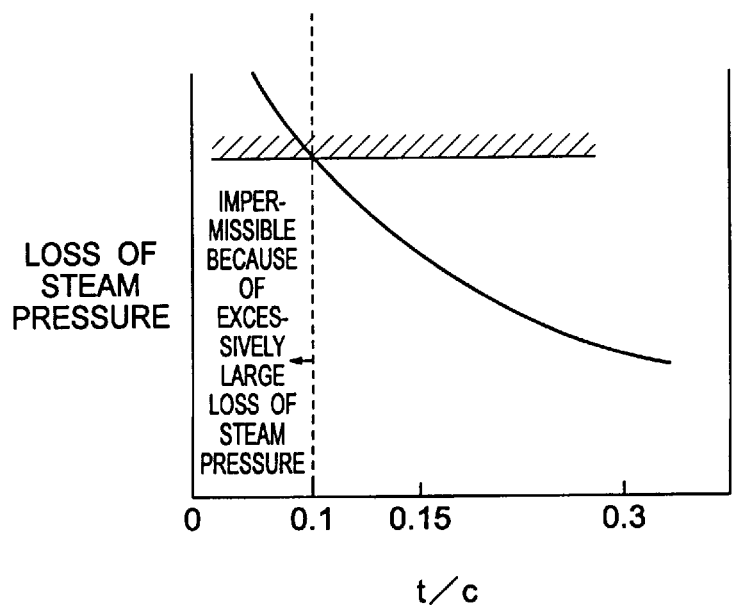
FIG. 4 is a graph illustrating the relationship between the blade thickness/chord length ratio and loss of steam pressure in the stationary blade for the turbine according to the exemplary embodiment shown in FIG. 1.
Figure 5:
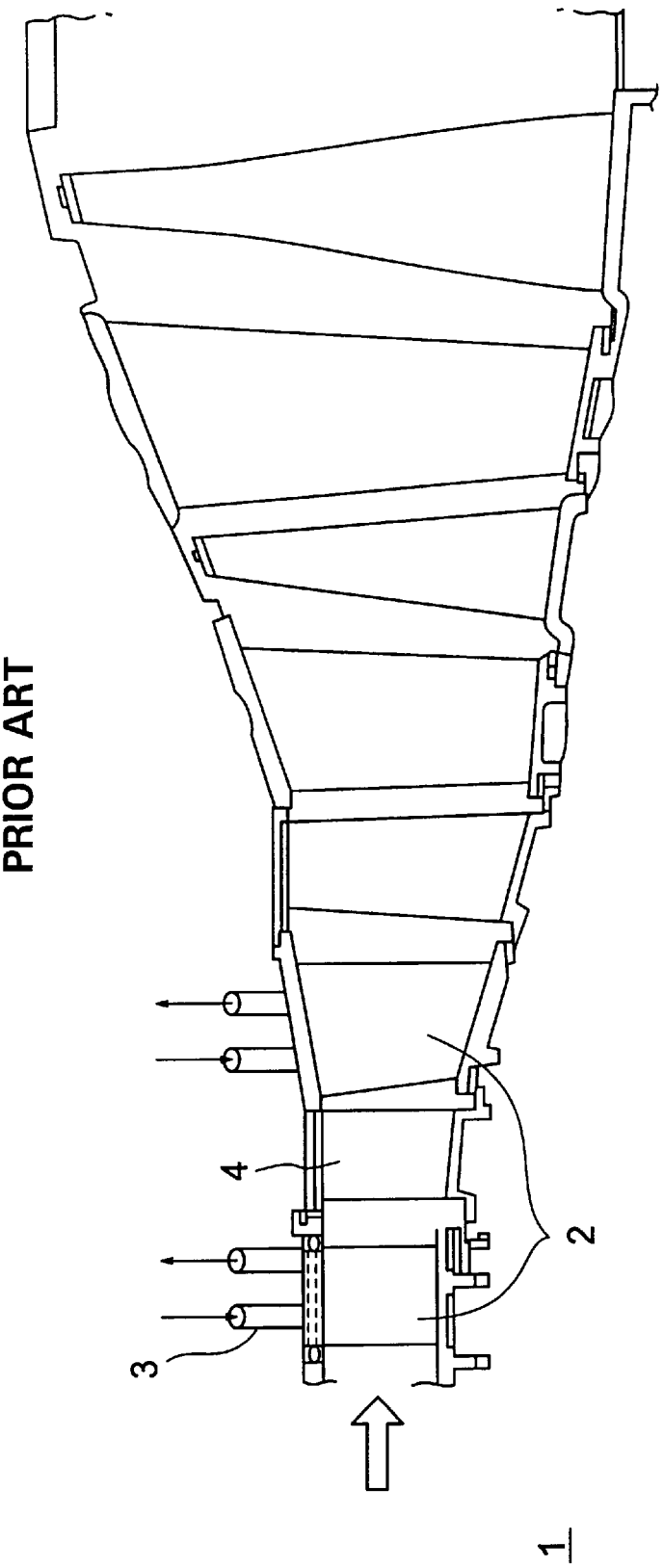
FIG. 5 is a schematic view of a structure of a conventional steam cooling type gas turbine.
Figure 6:
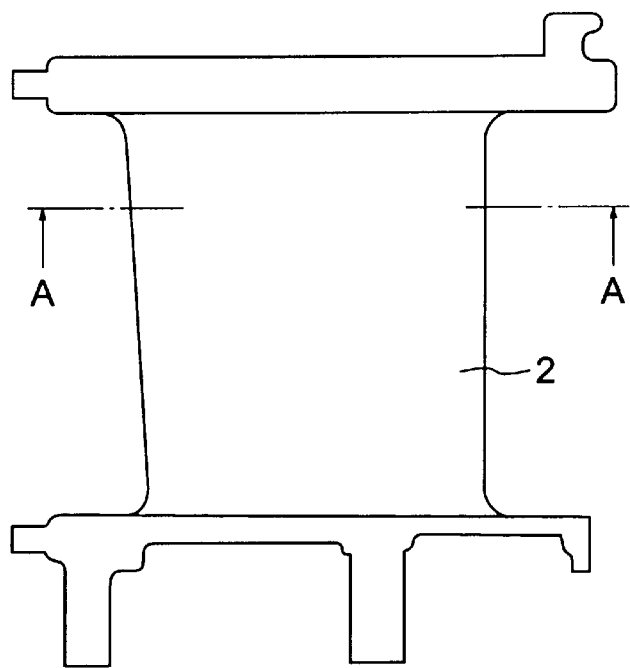
FIG. 6 is a detail view showing a stationary blade for the conventional steam cooling type turbine.
Figure 7:
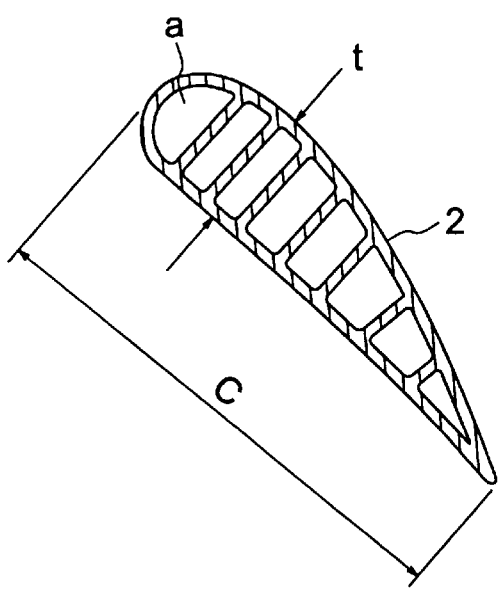
FIG. 7 is a view taken along the direction indicated by the arrows A in FIG. 6 and shows a cross section of a conventional stationary blade for a steam cooling type turbine.
Figure 8:
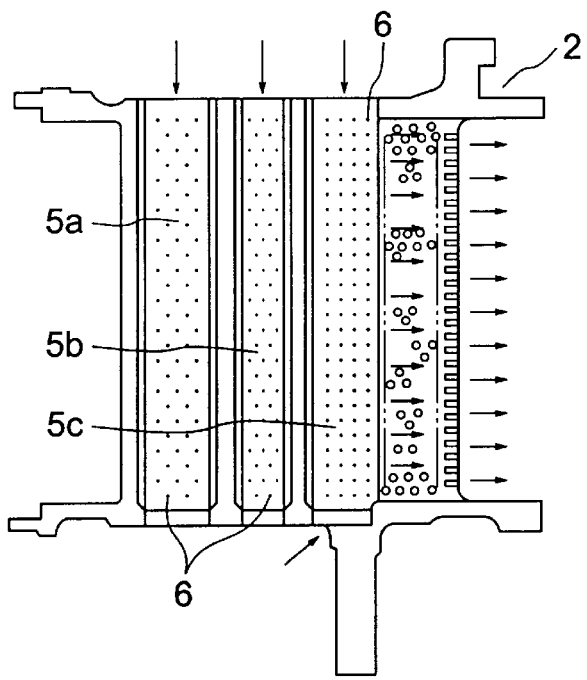
FIG. 8 is a vertical section of a conventional stationary blade for an air cooling type turbine.
Figure 9:
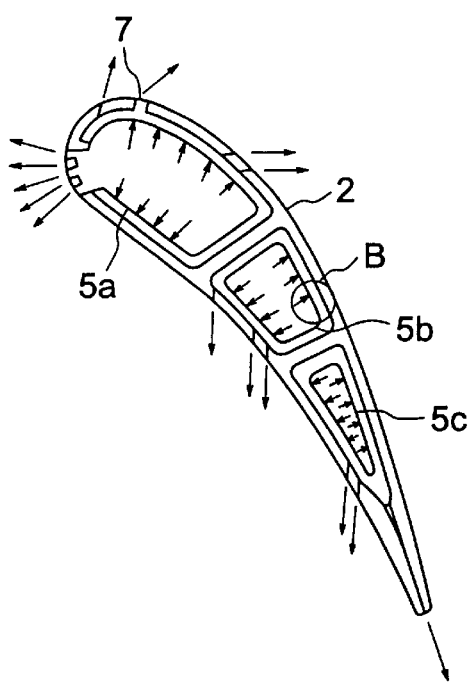
FIG. 9 is a cross-sectional view showing a conventional stationary blade for an air cooling type turbine.
Figure 10:
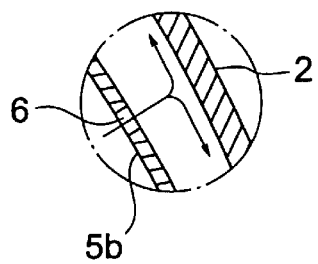
FIG. 10 is a detail view showing the portion B shown in FIG. 9 for illustrating cooling of an inner surface of a stationary blade for a turbine using cooling air.

Further, FIG. 4 is a graph of the relationship between the ratio t/c of the blade thickness t to the chord length c and steam pressure loss. As can be seen from this figure, when the ratio t/c of the blade thickness t to the chord length c is smaller than 0.10, pressure loss of the steam increases excessively, rendering the blade inappropriate for steam cooling. Accordingly, it is preferred that the ratio t/c of the blade thickness t to the chord length c lies within a range of 0.10 to 0.15 in order to obtain effective cooling of the turbine blade and effective reutilization of the recovered coolant steam.

As is apparent from the foregoing, the turbine blade according to the present invention can exhibit the cooling performance required of the turbine blade at a low steam flow rate because the ratio of the blade thickness to the chord length is not greater than 0.15. Further, by making the ratio of the blade thickness to the chord length in the range of from 0.10 to 0.15, in addition to the above-mentioned advantageous effect, effective reutilization of the recovered coolant steam can be realized.

In the foregoing, the embodiment of the present invention which is considered preferable at present and other alternative embodiments have been described in detail with reference to the drawings. It should, however, be noted that the present invention is never restricted to these embodiments but other various applications and modifications of the blade for the gas turbine can easily be conceived and realized by those skilled in the art without departing from the spirit and scope of the present invention.

What is claimed is:

1. A blade for a gas turbine equipped with an internally formed coolant steam passage for cooling the blade with coolant steam flowing through said coolant steam passage, wherein a ratio of blade thickness of said gas turbine blade to chord length thereof lies within a range of 0.10 to 0.15.

* * * * *